(12) United States Patent
Choi (10) Patent No.: US 7,527,275 B2
(45) Date of Patent: May 5, 2009

(54) WHEEL ALIGNMENT AND VEHICLE HEIGHT ADJUSTING APPARATUS

(75) Inventor: Sang-Jun Choi, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 173 days.

(21) Appl. No.: 11/299,390

(22) Filed: Dec. 8, 2005

(65) Prior Publication Data

US 2006/0125198 A1 Jun. 15, 2006

(30) Foreign Application Priority Data

Dec. 15, 2004 (KR) ............... 10-2004-0106110

(51) Int. Cl.
*B62D 17/00* (2006.01)
(52) U.S. Cl. ............... 280/86.752; 280/86.751; 280/124; 280/147; 280/6.157; 280/5.521; 280/5.514
(58) Field of Classification Search ............... 280/5.514, 280/5.52, 5.521, 6.15, 6.157, 86.75, 86.751, 280/86.752, 86.753, 124.145, 124.146, 124.147, 280/678; 267/220
See application file for complete search history.

(56) References Cited

U.S. PATENT DOCUMENTS

| | | | | | |
|---|---|---|---|---|---|
| 2,678,830 | A | * | 5/1954 | Cigan et al. | 280/124.143 |
| 2,907,578 | A | * | 10/1959 | Taber | 280/5.508 |
| 3,096,994 | A | * | 7/1963 | Primeau et al. | 280/86.753 |
| 4,372,575 | A | * | 2/1983 | Hyma | 280/86.752 |
| 4,946,188 | A | * | 8/1990 | Key et al. | 280/86.752 |
| 5,306,031 | A | * | 4/1994 | Quinn et al. | 280/6.15 |
| 5,536,035 | A | * | 7/1996 | Bautz et al. | 280/124.139 |
| 6,257,601 | B1 | * | 7/2001 | Spears et al. | 280/86.752 |
| 6,485,223 | B1 | * | 11/2002 | Van Schmus et al. | 403/408.1 |
| 6,588,780 | B2 | * | 7/2003 | Hayashi et al. | 280/124.147 |
| 7,077,371 | B1 | * | 7/2006 | Kroeker | 248/205.1 |
| 7,137,636 | B2 | * | 11/2006 | Bennett | 280/124.147 |
| 7,144,021 | B2 | * | 12/2006 | Carlson | 280/86.752 |

FOREIGN PATENT DOCUMENTS

JP 2001-1730 * 1/2001

* cited by examiner

*Primary Examiner*—John Q. Nguyen
*Assistant Examiner*—George D. Spisich
(74) *Attorney, Agent, or Firm*—Morgan, Lewis & Bockius LLP (57) ABSTRACT

At least three length varying means, mounted between an upper end of a strut and a vehicle body, change the position of the strut in relation to the vehicle body, thereby enabling active adjustment of the camber, caster, and vehicle height.

17 Claims, 8 Drawing Sheets

WHEEL ALIGNMENT AND VEHICLE HEIGHT ADJUSTING APPARATUS

CROSS-REFERENCE TO RELATED APPLICATIONS

The present application is based on, and claims priority from, Korean Application Serial Number 10-2004-0106110, filed on Dec. 15, 2004, the disclosure of which is hereby incorporated by reference herein in its entirety.

FIELD OF THE INVENTION

The present invention relates to a wheel alignment and vehicle height adjusting apparatus that actively adjusts the camber and caster of the wheel, as well as vehicle height.

BACKGROUND OF THE INVENTION

The camber and caster of a vehicle can conventionally be adjusted only by separate maintenance. However, if the camber and caster are actively adjusted according to driving conditions, the grip force of the tire, steering stability and ride comfort of the vehicle are improved.

Furthermore, if the vehicle height is adjusted during the vehicle motion, the ride comfort can be greatly improved with the operation of an electronic suspension system, and the like.

SUMMARY OF THE INVENTION

Embodiments of the present invention actively adjust the camber, caster, and height of a vehicle, thereby significantly improving the grip force of the tires, steering stability, and ride quality.

A wheel alignment and vehicle height adjusting apparatus includes a strut and a plurality of length varying means installed between the upper end of the strut and vehicle body. The length varying means may be extendably installed such that their lengths vary along a longitudinal direction of said strut, and, in the preferred embodiments, three length varying means are mounted to form a triangle with said strut at the center thereof. The length varying means can include hydraulic cylinders varying in length by hydraulic pressure.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
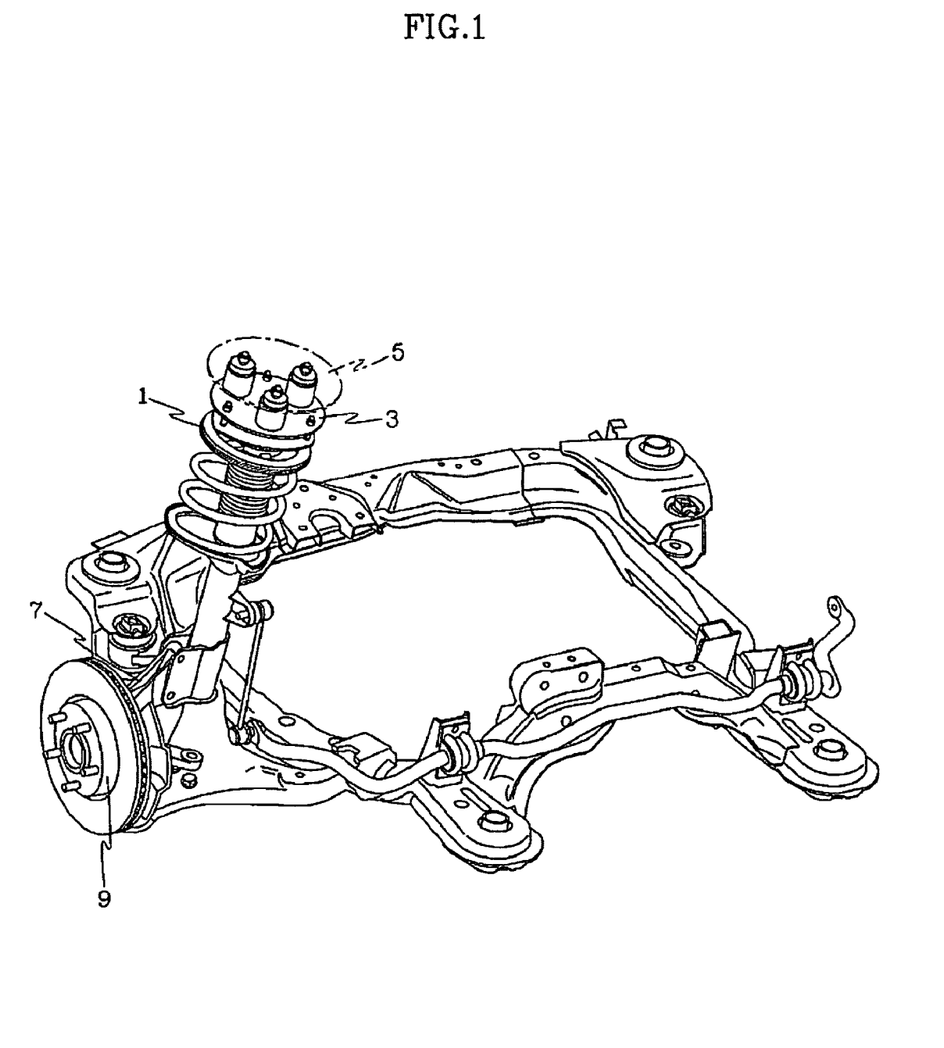
FIG. 1 illustrates a wheel alignment and vehicle height adjusting apparatus according to an embodiment of the present invention.

Referring to FIG. 1, a first embodiment of the present invention includes a strut 1 and a bracket 3 equipped at the upper end of strut 1. At least three length varying means 13 are disposed between bracket 3 and a vehicle body 5.

Strut 1 is coupled at the lower portion thereof to a knuckle 7 that is connected to a wheel hub 9. Therefore, if the coupled position of the upper end of strut 1 in relation to vehicle body 5 is varied, the camber of the wheel and caster vary accordingly; that is, the upper end of strut 1 of the present invention can actively vary in its coupled position relative to vehicle body 5.

Figure 4:
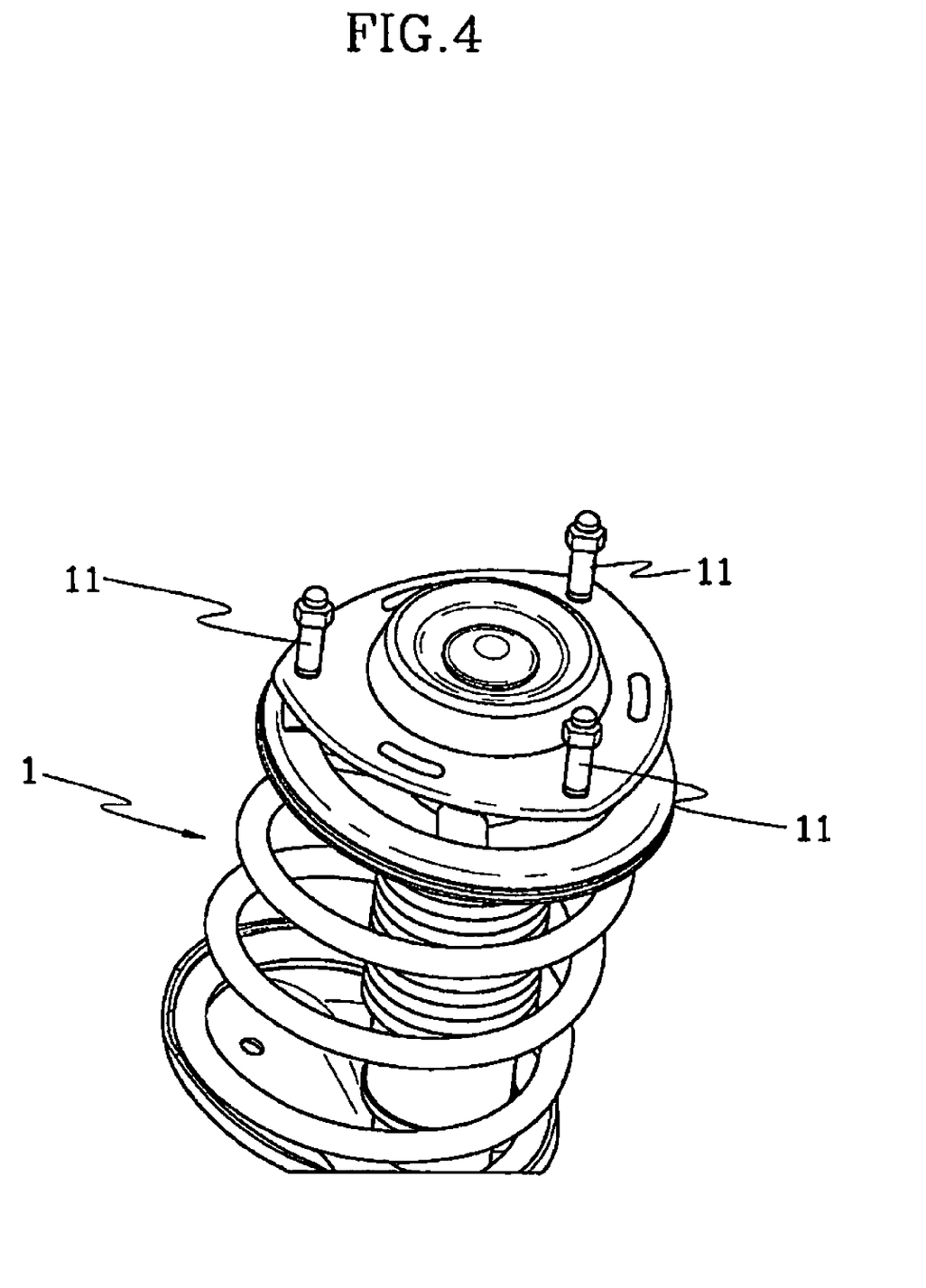
FIG. 4 illustrates mounting bolts coupled at an upper end of a strut.

Bracket 3 is formed in the shape of a disk, and the upper end of strut 1 and bracket 3 are fixed via a plurality of mounting bolts 11 (see FIG. 4).

Bracket 3 facilitates the performance of the present invention by allowing length varying means 13 to be installed without any significant variation of a commonly used strut 1. Thus, bracket 3 is an element for installing length varying means 13 between strut 1 and vehicle body 5. In another embodiment, described later, length varying means 13 are placed directly on strut 1.

Figure 2:
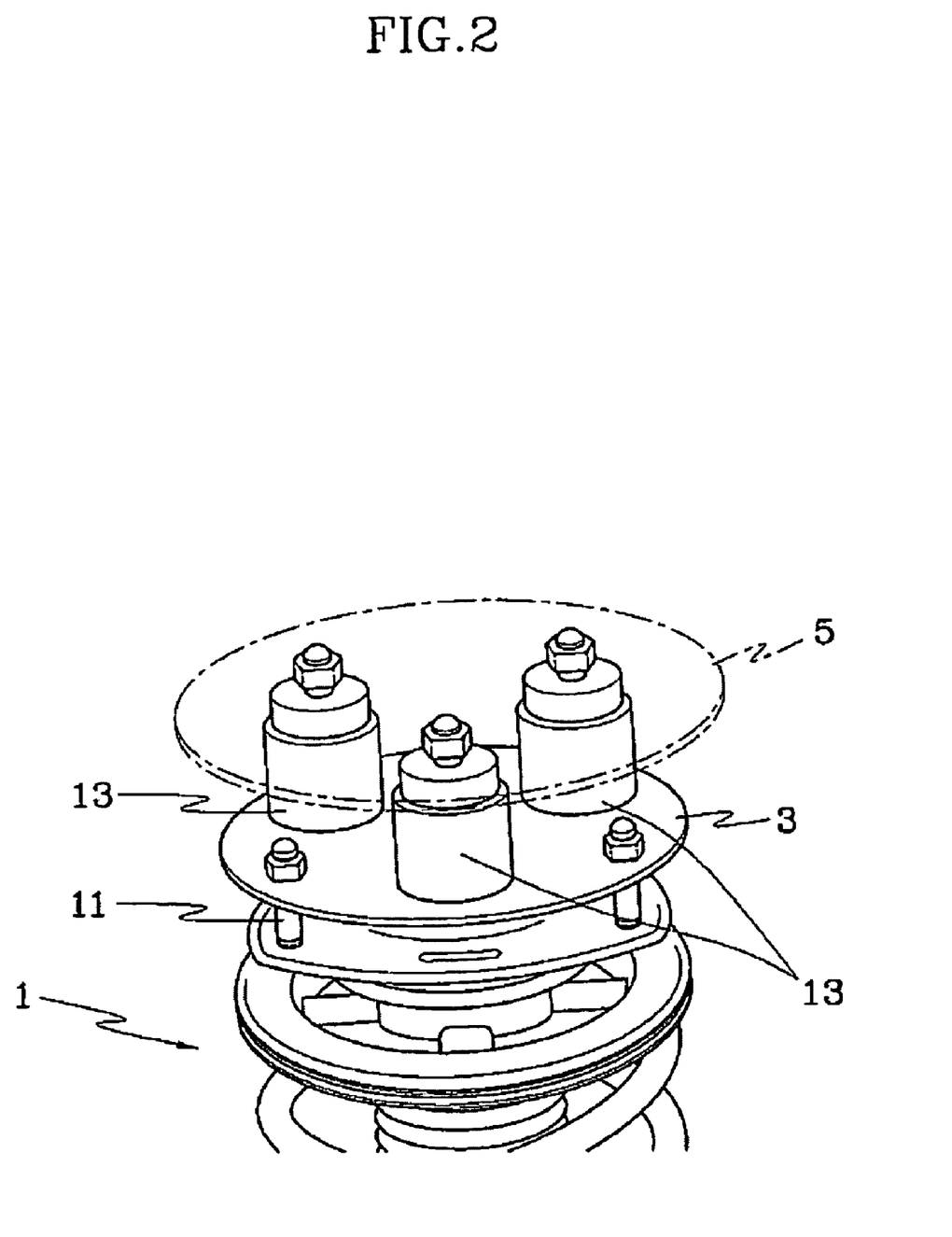
FIG. 2 is an enlarged detailed view of the principle portion of the embodiment illustrated in FIG. 1.

In one embodiment, as illustrated in FIG. 2, length varying means 13 comprise hydraulic cylinders that vary in their total lengths by hydraulic pressure and are extendably installed in the longitudinal direction of strut 1. Three length varying means 13 are mounted to form a triangle with strut 1 as its center.

The hydraulic cylinders are configured to receive the hydraulic pressure via a hydraulic supplying apparatus (not shown), which is regulated by a controller that receives inputs from sensors that detect various states of the vehicle. The controller may comprise a processor, memory, and associated hardware, software and/or firmware as may be selected and programmed by a person of ordinary skill in the art based on the teachings of the present invention.

Length varying means 13 may be incorporated with an electric motor, worm gear, rack, or the like.

Figure 3:
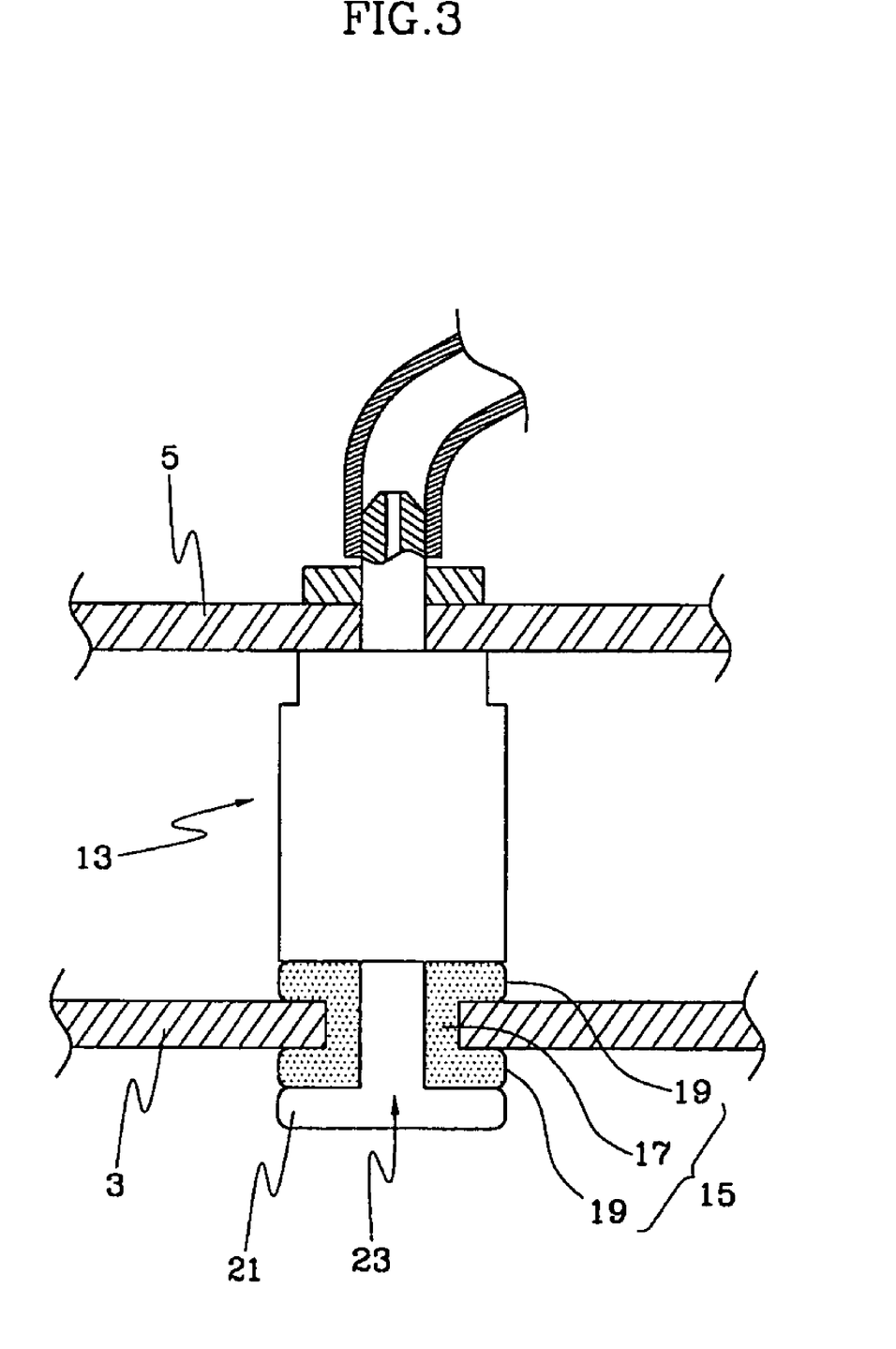
FIG. 3 illustrates a hydraulic cylinder installed between the vehicle body and bracket.

Either the upper or lower end of length varying means 13 is fixed via a member to vehicle body 5 or bracket 3 (see FIG. 3). If three length varying means 13 are inconsistently expanded and contracted in length and the inclination of bracket 3 in relation to vehicle body 5 is changed thereby, then member 15 absorbs the inclination change of bracket 3.

In the first embodiment, member 15 is interposed between bracket 3 and the lower end of length varying means 13. Member 15 comprises a cylinder 17 penetrating bracket 3, and flanges 19 connected to both ends of cylinder 17.

A support extrusion 23 is formed at the bottom of length varying means 13 to penetrate cylinder 17 of member 15. Support extrusion 23 has at the bottom thereof a support flange 21 that contacts flange 19 of member 15.

Accordingly, the bottom of length varying means 13 indirectly affixes to bracket 3 via member 15, thus allowing the inclination between bracket 3 and member 15 to be varied.

Adjustment of camber, caster, and vehicle height will now be described according to the first exemplary embodiment of the present invention, which is illustrated in FIGS. 1-6.

Figure 5:
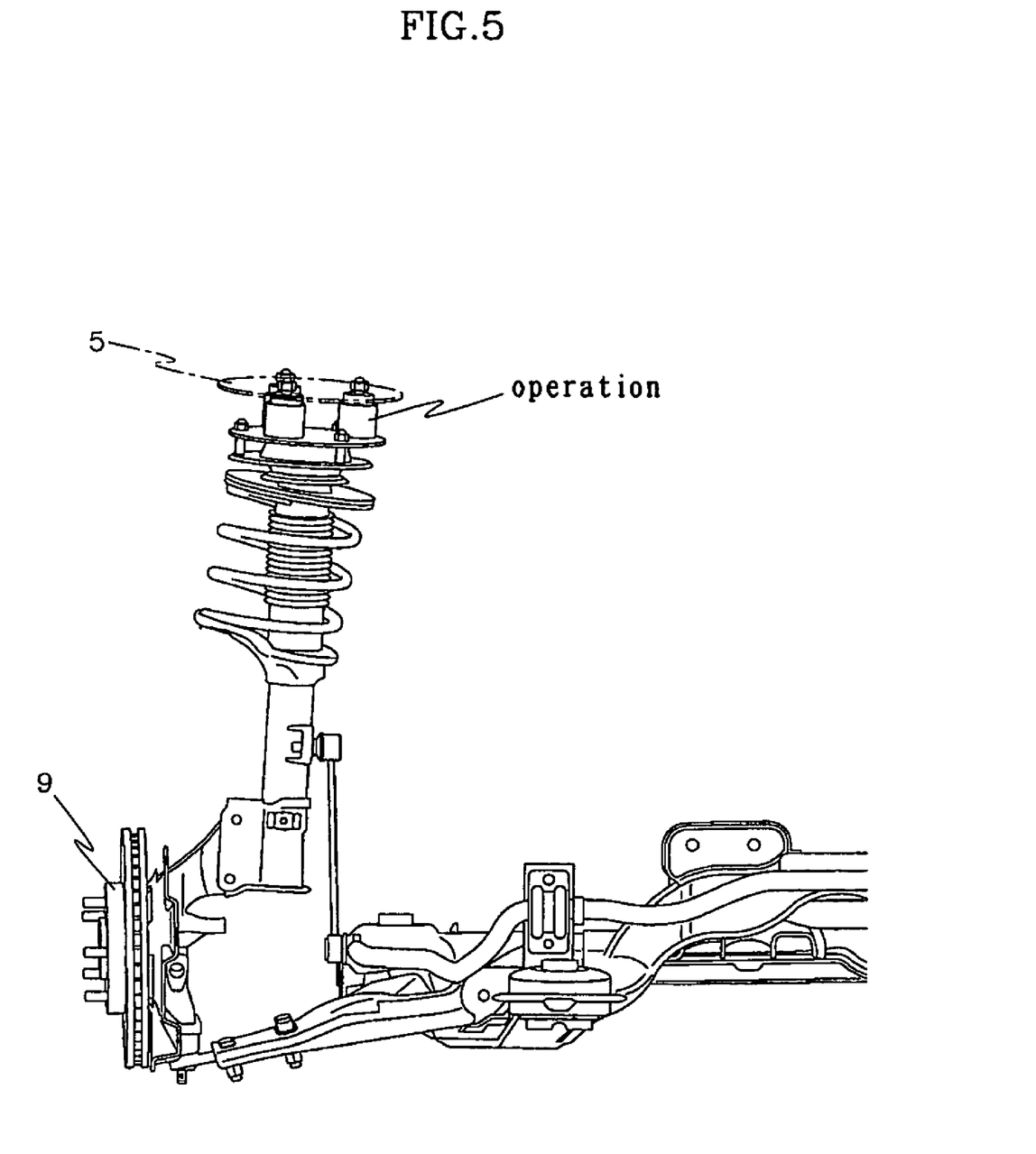
FIG. 5 illustrates a state in which camber is adjusted according to the embodiment illustrated in FIG. 1.

Referring to FIG. 5, when any one of length varying means 13 expands or contracts in response to the controller restricting the hydraulic supplying apparatus, the camber is adjusted. If the hydraulic pressure level is increased in the length varying means 13 that is marked "operation" in FIG. 5, then bracket 3 and strut 1 rotate clockwise in relation to vehicle body 5 and a negative wheel camber occurs. Likewise, if the hydraulic pressure decreases, bracket 3 and strut 1 rotate approximately counterclockwise and the camber gradually turns positive.

Figure 6:
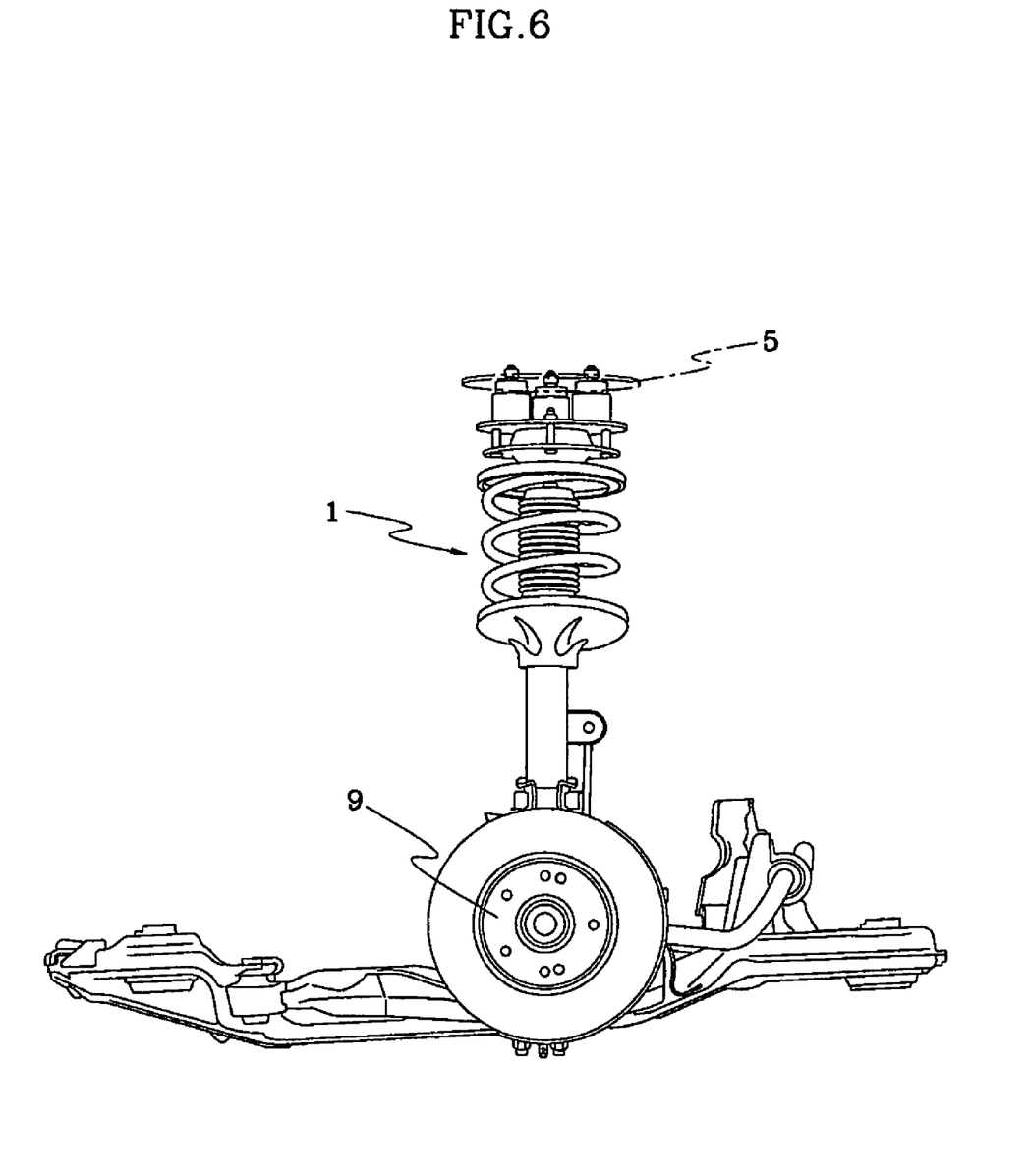
FIG. 6 illustrates a state of adjusting a caster and vehicle height according to the embodiment illustrated in FIG. 1.

In FIG. 6, if either the left or right length varying means 13 is expanded or contracted, bracket 3 and strut 1 rotate either clockwise or counterclockwise in relation to vehicle body 5, causing an increase or decrease of the caster.

Provided that all of three length varying means 13 extend or contract to the same length, then the location of strut 1 relative to vehicle body 5 is changed, resulting in the adjustment of the vehicle height.

When the camber, caster, and vehicle height are actively adjusted according to the driving state, the grip force of the tire, steering stability, and ride comfort can remarkably be developed.

Figure 7:
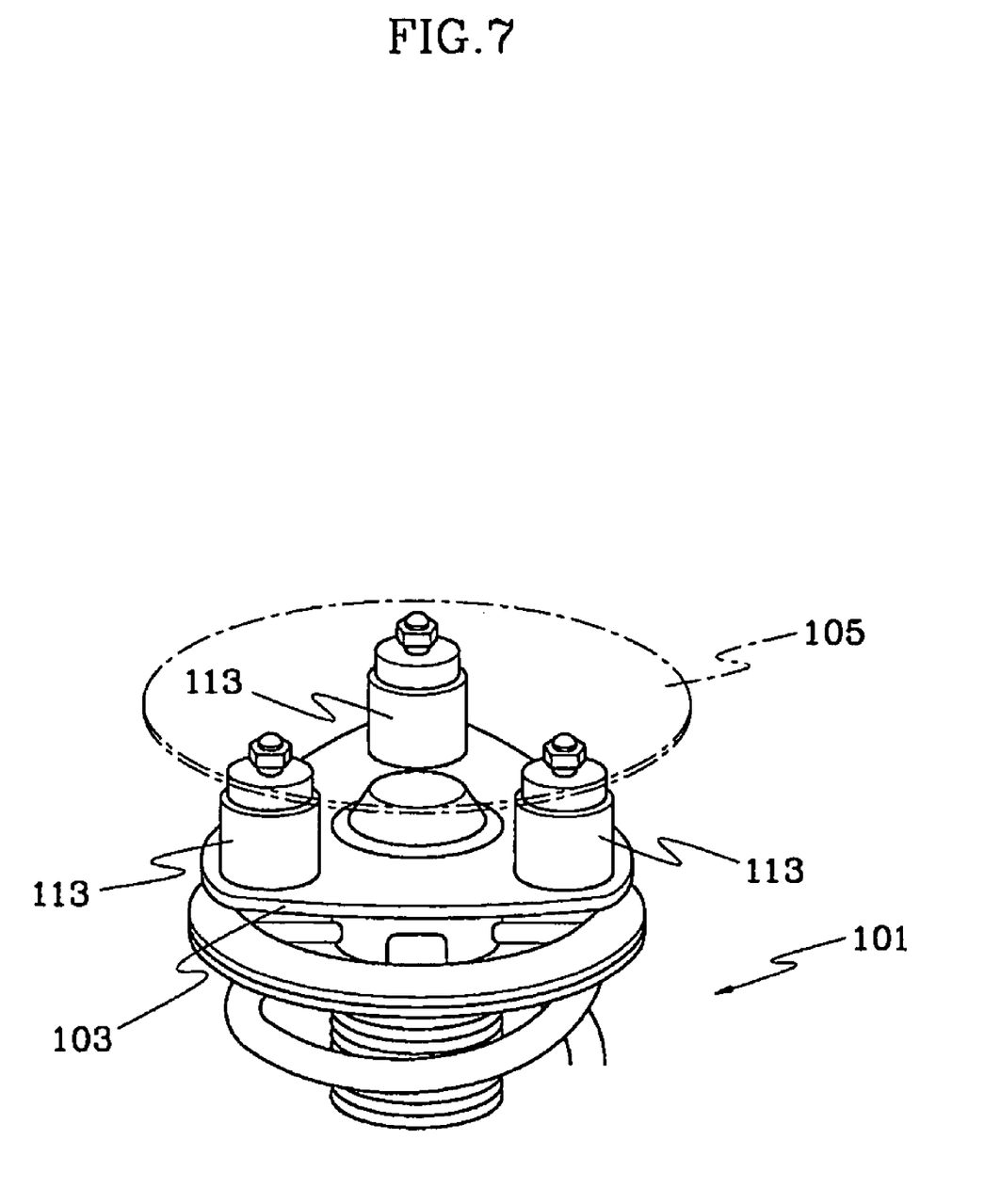
FIG. 7 is an enlarged detailed view of the principle portion of a second embodiment of the present invention.
Figure 8:
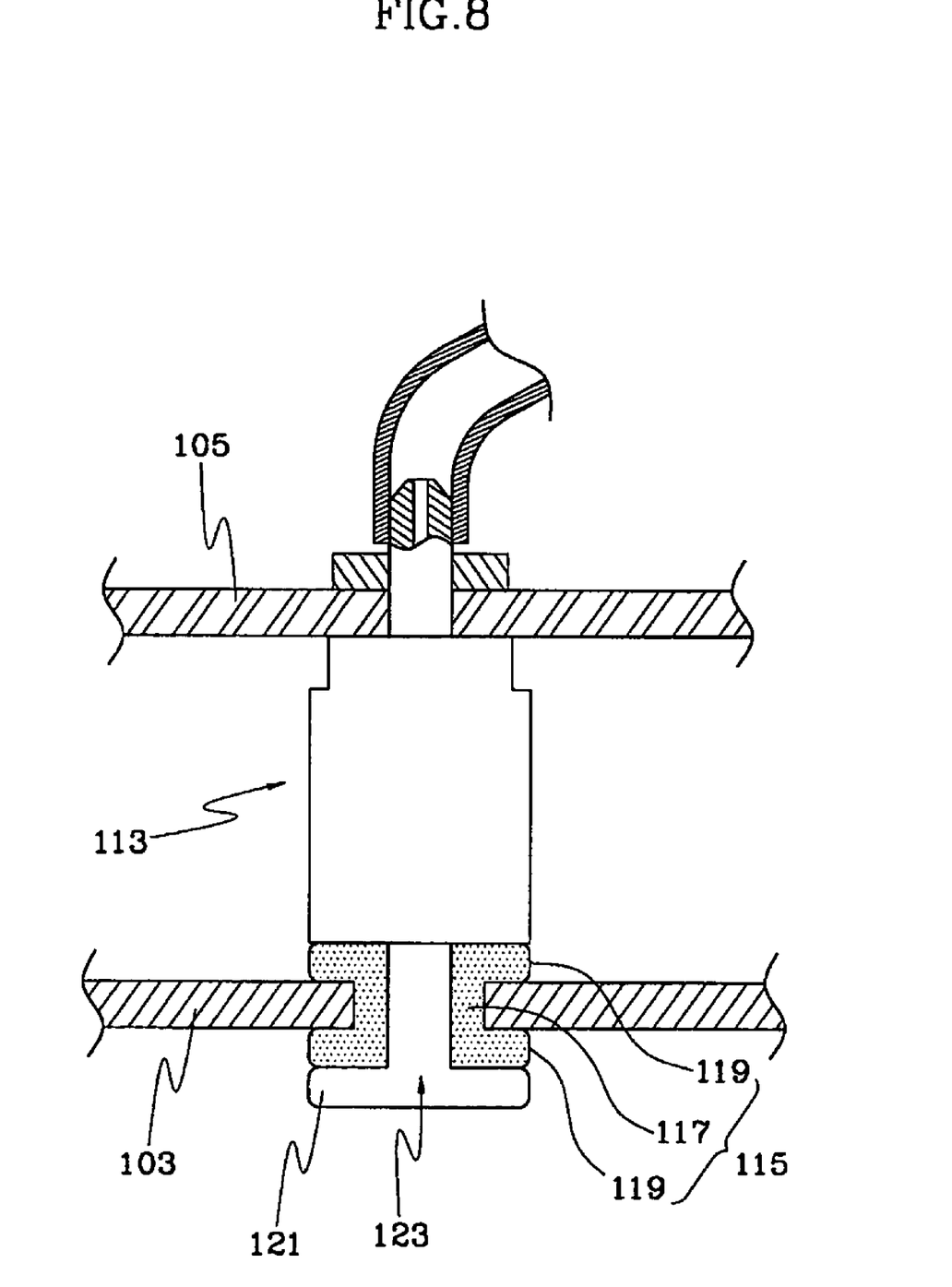
FIG. 8 illustrates a hydraulic cylinder installed between the vehicle body and bracket according to the second embodiment of the present invention.

FIGS. 7 and 8 illustrate another embodiment of the present invention without the bracket. Three length varying means 113 are directly mounted between a strut top panel 103, which constitutes the upper end of a strut 101, and a vehicle body 105.

Either the upper or lower end of length varying means 113 is fixed via member 115 to vehicle body 105 or strut top panel 103. Therefore, when three length varying means 113 inconsistently expand or contract and the inclination of strut top panel 103 in relation to vehicle body 105 is adjusted, member 115 absorbs the above inclination change.

Member 115 is disposed between the lower end of length varying means 113 and strut top panel 103 in this embodiment. Member 115 is constituted by a cylinder 117 penetrating the upper end of strut top panel 103, and flanges 119 connected to both ends of the cylinder.

The bottom of length varying means 113 is mounted with a support extrusion 123 that penetrates cylinder 117 of member of 115 and has a support flange 121 contacting flange 119 of member 115.

In the second embodiment, the camber, caster, and vehicle height can actively be adjusted in a simpler structure than that of the first embodiment.

As apparent from the foregoing, there is an advantage in that the camber, caster, and vehicle height can be actively adjusted, thereby improving the grip force of the tire, steering stability, and ride comfort of the vehicle.

What is claimed is:

1. A wheel alignment and vehicle height adjusting apparatus, comprising:
    a strut; and
    a plurality of length varying means installed substantially in parallel to and around the longitudinal center axis of said strut and connected between an upper end of said strut and a vehicle body,
    wherein said length varying means are installed such that their lengths vary along a longitudinal direction of said strut after installation, and three length varying means are mounted, defining a triangle wherein the longitudinal center axis of said strut extends through the triangle, and
    wherein said triangle is at least substantially equilateral and said strut is at least substantially at the center thereof.

2. The apparatus as defined in claim 1, further comprising a bracket disposed between the upper end of said strut and said length varying means.

3. The apparatus as defined in claim 2, wherein said bracket has the shape of a disk, and the upper end of said strut and said bracket are attached with a plurality of mounting bolts.

4. The apparatus as defined in claim 2, wherein an upper end of each of said length varying means is an extendable member fixed to said vehicle body.

5. The apparatus as defined in claim 2, wherein a lower end of each of said length varying means is an extendable member fixed to said bracket.

6. The apparatus as defined in claim 5, wherein said extendable member comprises a cylinder penetrating said bracket, and an upper and a lower flange connected to an upper and a lower end of said cylinder, respectively.

7. The apparatus as defined in claim 6, wherein a support extrusion is formed at a bottom of said length varying means to penetrate said cylinder of said extendable member and has at a bottom thereof a support flange that contacts said lower flange of said extendable member.

8. The apparatus as defined in claim 1, wherein an upper end of each of said length varying means includes a first member that is fixed to said vehicle body.

9. The apparatus as defined in claim 1, wherein a lower end of each of said length varying means includes a second member that is fixed to a strut top panel.

10. The apparatus as defined in claim 9, wherein said second member comprises a cylinder penetrating the strut top panel, and an upper flange and a lower flange connected to an upper and a lower end of said cylinder, respectively.

11. The apparatus as defined in claim 10, wherein a bottom of said length varying means is mounted with a support extrusion that penetrates said cylinder of said second member and has at a bottom thereof a support flange contacting said lower flange of said second member.

12. A wheel alignment and vehicle height adjusting apparatus, comprising:
    a strut; and
    a plurality of length varying means installed substantially in parallel to and around the longitudinal center axis of said strut and connected between an upper end of said strut and a vehicle body,
    wherein said length varying means comprise hydraulic cylinders varying in length in response to hydraulic pressure.

13. A wheel alignment and vehicle height adjusting apparatus, comprising:
    a strut; and
    a plurality of length varying means installed substantially in parallel to and around longitudinal center axis of said strut and connected between an upper end of said strut and a vehicle body,
    wherein said length varying means are installed such that their lengths vary along a longitudinal direction of said strut after installation, and three length varying means are mounted, defining a triangle wherein the longitudinal center axis of said strut extends through the triangle.

14. The apparatus as defined in claim 13, wherein an upper end of each of said length varying means includes a first member that is fixed to said vehicle body.

15. The apparatus as defined in claim 13, wherein a lower end of each of said length varying means includes a second member that is fixed to a strut top panel.

16. The apparatus as defined in claim 15, wherein said second member comprises a cylinder penetrating the strut top panel, and an upper flange and a lower flange connected to an upper and a lower end of said cylinder, respectively.

17. The apparatus as defined in claim 16, wherein a bottom of said length varying means is mounted with a support extrusion that penetrates said cylinder of said second member and has at a bottom thereof a support flange contacting said lower flange of said second member.

* * * * *